United States Patent
Stura et al.

(10) Patent No.: US 8,983,427 B2
(45) Date of Patent: Mar. 17, 2015

(54) ONLINE CHARGING SYSTEM (OCS) CONTROLLED MEDIA POLICY

(75) Inventors: Marco Stura, Rueglio (IT); Pertti Rantala, Espoo (FI); Jani Ekman, Kangasala (FI); Juha-Pekka Koskinen, Hml (FI); Anne Narhi, Tampere (FI); Juha R. Vallinen, Nokia (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1207 days.

(21) Appl. No.: 11/587,194

(22) PCT Filed: Apr. 22, 2005

(86) PCT No.: PCT/IB2005/001282
§ 371 (c)(1),
(2), (4) Date: Sep. 28, 2007

(87) PCT Pub. No.: WO2005/104519
PCT Pub. Date: Nov. 3, 2005

(65) Prior Publication Data
US 2008/0153457 A1 Jun. 26, 2008

(30) Foreign Application Priority Data
Apr. 22, 2004 (GB) .................. 0408990.0

(51) Int. Cl.
| H04M 11/00 | (2006.01) |
| H04M 17/00 | (2006.01) |
| G06Q 20/10 | (2012.01) |
| H04L 12/14 | (2006.01) |
| H04M 15/00 | (2006.01) |
| H04L 29/06 | (2006.01) |
| H04L 12/58 | (2006.01) |

(52) U.S. Cl.
CPC .............. *H04M 17/00* (2013.01); *G06Q 20/10* (2013.01); *H04L 12/14* (2013.01); *H04L 12/1467* (2013.01); *H04M 15/57* (2013.01); *H04M 15/63* (2013.01); *H04M 15/8292* (2013.01); *H04M 15/854* (2013.01); *H04L 65/1006* (2013.01); *H04L 12/58* (2013.01); *H04M 2215/204* (2013.01); *H04M 2215/208* (2013.01); *H04M 2215/8166* (2013.01); *H04L 65/1016* (2013.01)
USPC ............ 455/406; 455/407; 455/408; 709/206

(58) Field of Classification Search
CPC ..... H04W 4/24; H04W 4/26; H04M 2215/32; H04M 2215/0124; H04M 2215/0128; H04M 2215/012; H04M 2215/0168
USPC .......................................................... 455/406
See application file for complete search history.

(56) References Cited

U.S. PATENT DOCUMENTS

| 6,138,156 | A | * | 10/2000 | Fletcher et al. | ............... 709/224 |
| 7,275,243 | B2 | * | 9/2007 | Gibbons et al. | ............... 717/159 |
| 2001/0053687 | A1 | * | 12/2001 | Sivula | .......................... 455/412 |

(Continued)

OTHER PUBLICATIONS

International Search Report of International Application No. PCT/IB2005/001282, Date of Completion of Search—Jul. 25, 2005.

*Primary Examiner* — Mazda Sabouri

(57) ABSTRACT

A method of communication comprising the steps of: requesting at least one service having a plurality of parts; determining if said at least one service can be provided taking into account credit information relating to a user; and if not providing only one or some of said plurality of parts of said at least one service.

32 Claims, 6 Drawing Sheets

(56) References Cited

U.S. PATENT DOCUMENTS

| | | | |
|---|---|---|---|
| 2003/0005133 A1* | 1/2003 | Banerjee et al. | 709/229 |
| 2004/0064563 A1* | 4/2004 | Kauhanen et al. | 709/227 |
| 2004/0128386 A1* | 7/2004 | Oomoto et al. | 709/226 |
| 2010/0009654 A1* | 1/2010 | Fougnies et al. | 455/406 |

* cited by examiner

ONLINE CHARGING SYSTEM (OCS) CONTROLLED MEDIA POLICY

FIELD OF THE INVENTION

The present invention relates to charging in communication networks, and in particular but not exclusively in third generation (Universal mobile telecommunication system UMTS) networks.

BACKGROUND OF THE INVENTION

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interfaces. A feature of wireless communication systems is that they provide mobility for the users thereof. An example of communication systems providing wireless communication is a public land mobile network (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user, or more precisely user equipment, is provided with a circuit switched server or a packet switched server or both. Communication protocols and/or parameters which should be used for the connection are also typically defined. For example, the manner how communication shall be implemented between the user equipment and the elements of the communication networks is typically based on a predefined communication protocol. In other words, a specific set of "rules" on which the communication can be based needs to be defined to enable the user equipment to communicate via the communication system.

The introduction of Third Generation (3G) communication systems will significantly increase the possibilities for accessing services on the Internet via mobile user equipment (UE) as well as other types of UE.

Various user equipment (UE) such as computers (fixed or portable), mobile telephones, personal data assistants or organisers and so on are known to the skilled person and can be used to access the Internet to obtain services. Mobile user equipment referred to as a mobile station (MS) can be defined as a means that is capable of communication via a wireless interface with another device such as a base station of a mobile telecommunication network or any other station.

The term "service" used above and hereinafter will be understood to broadly cover any service or goods which a user may desire, require or be provided with. The term also will be understood to cover the provision of complimentary services. In particular, but not exclusively, the term "service" will be understood to include Internet protocol multimedia IM services, conferencing, telephony, gaming, rich call, presence, e-commerce and messaging e.g. instant messaging. A "service" may comprise two or more parts. For example, a video telephone service comprises a voice part and a video part. Alternatively two or more services may be provided at the same time, for example a gaming service and a chatroom service may be provided at the same time.

The 3G Partnership Project (3GPP) is defining a reference architecture for the Universal Mobile Telecommunication System (UMTS) core network which will provide the users of user equipment UE with access to these services. This UMTS core network is divided into three principal domains. These are the Circuit Switched domain, the Packet Switched domain and the Internet Protocol Multimedia (IM) domain.

The latter of these, the IM domain, makes sure that multimedia services are adequately managed. The IM domain supports the Session Initiation Protocol (SIP) as developed by the Internet Engineering Task Force (IETF).

In prepaid schemes, when a service or services are being requested, the S-CSCF/SCF (serving call session control function/session charging functions) requests a quota (allocation of money which has been prepaid) from the Online Charging System (OCS). The S-CSCF/SCF sends all the service information required to rate the service. In the case of a SIP session, all the SDP (Session Description Protocol) information such as media type, media codec etc. are sent to the OCS. If the account cannot cover the cost of the service or services requested, the OCS instructs the S-CSCF/SCF to release the ongoing session. However, the account may have sufficient fund in it to pay for a subset of the requested medias, for instance if a video call (voice and video) is requested the account may cover the cost for the voice component only. Nevertheless, with the current proposals the session will be released.

SUMMARY OF THE INVENTION

It is an aim of embodiments of the present invention to address the problems discussed previously According to a first embodiment of the present invention, there is provided a method of communication comprising the steps of: requesting at least one service having a plurality of parts; determining if said at least one service can be provided taking into account credit information relating to a user; and if not providing only one or some of said plurality of parts of said at least one service.

According to another embodiment of the present invention there is provided a communication system comprising: user equipment arranged to request at least one service having a plurality of parts; means for determining if said at least one service can be provided taking into account credit information relating to a user; and means for providing, if not, only one or some of said plurality of parts of said at least one service.

According to another embodiment of the present invention, there is provided a charging node for use in a communications system, said node being arranged to receive information for a user indicating the at least one service requested, said at least one service having a plurality of parts, to check for said user associated credit information to determine if all of the requested at least one service can be provided, and if not to determine which of said plurality of parts is to be dropped.

According to another embodiment of the present invention there is provided a charging node for use in a communications system, said node being arranged to determine information for a user indicating which at least one service and/or components of at least one service can be provided together, taking in to account user associated credit information and to provide said information to another node.

According to another embodiment of the present invention, there is provided a user equipment for use in a communication system, said user equipment being arranged to determine if at least one service having a plurality of parts can be provided, taking into account credit information associated with a user of said user equipment, and if not to request only one or some of said plurality of parts.

In another embodiment there is provided a method of communication comprising the steps of: requesting at least one service for a user, the service being provided by a further user; determining if chargeable content in a message delivered by the further user can be provided to the user taking into account credit information relating to the further user; and if not, removing the chargeable content from the message before delivery to the user.

Delivery of the message to the user may establish a communication session between the user and the further user.

Responsive to removal of the chargeable content the further user may be notified of such.

BRIEF DESCRIPTION OF DRAWINGS

For a better understanding of the present invention and as to how the same may be carried into effect, reference will now be made to the accompanying drawings in which.

DETAILED DESCRIPTION OF EMBODIMENTS OF THE INVENTION

In this document, SIP messages are indicated in capitals.

Figure 1:
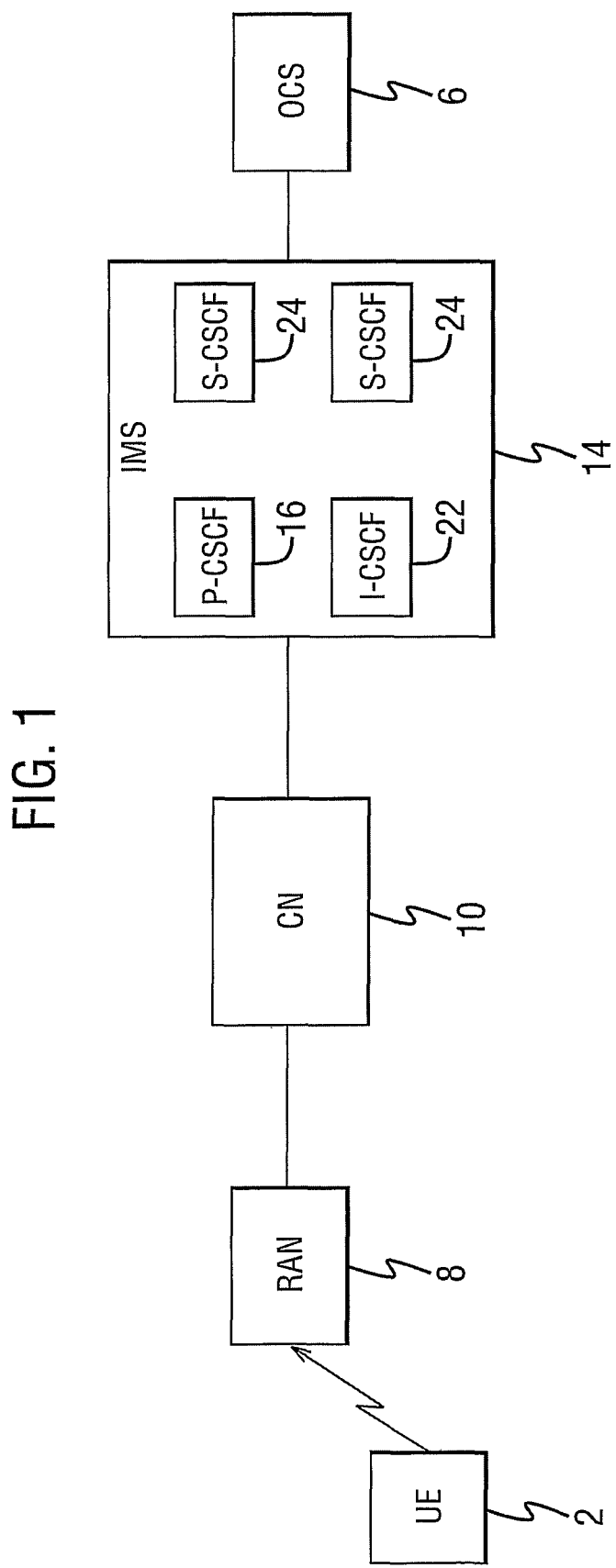
FIG. 1 shows a schematic system in which embodiments of the present invention can be implemented.

Reference is made to FIG. 1 which shows schematically a system in which embodiments of the invention can be implemented. The system comprises user equipment 2. The user equipment 2 can take any suitable form and may for example be a mobile or fixed entity such as a mobile telephone, personal digital assistant (PDA), portable computer, laptop computer, fixed computer or any other suitable device. The user equipment 2 is arranged to communication with a radio access network (RAN) 8 via a wireless connection. This wireless connection may be at any suitable frequency, such as for example a radio frequency.

The radio access network 8 generally consists of a base station entity (sometimes referred to as node B). For the purpose of this document, the term base station will be used and is intended-to cover any suitable entity. The radio access network 8 also comprises a control element. Depending on the standard, the control element can be referred to as a radio network controller (RNC) in the case of a UMTS system or a base station controller (BSC) in the case of a GSM system. It is intended that the term controller cover any such control entity. In some arrangements, the control function is provided separately from the base station function and a single control entity may control a number of base stations. In other embodiments of the present invention, each base station may incorporate part of the control function.

The radio access network is arranged to communicate with a core network 10. The core network 10 illustrated in FIG. 1 is a packet switched core network. The core network comprises at least one serving GPRS (general packet radio service) support node SGSN which is used to switch the packet switched transactions and at least one GPRS support nodes GGSN which are switches at the point where the core network 10 is connected to external packet switched networks.

The core network is connected to an IM (IP multi-media) subsystem 14. A GGSN is connected to a P-CSCF 16 (proxy call session control function) in the IMS 14. The P-CSCF is connected to a serving S-CSCF 24. The S-CSCF contacts an interrogating I-CSCF 22 in the terminated network. The I-CSCF 22 is arranged to determine the appropriate serving-CSCF (S) 24 for the end user, that is the called party.

It should be appreciated that in practice, there will be more that one P-CSCF, I-CSCF and S-CSCF.

The IMS 14 is connected to an Online charging system 6 which may be positioned in any location in the system.

FIG. 1 shows a calling party. The called party may be connected to a different or the same IMS. Likewise, the called party may be connected to the same or a different OCS. Where the called party is connected to a different IMS, a different core network and RAN are provided. Where the IMS is the same, different core networks may or may not be required. Likewise, the RAN may be the same or different for the called party to that of the calling party.

Figure 2:
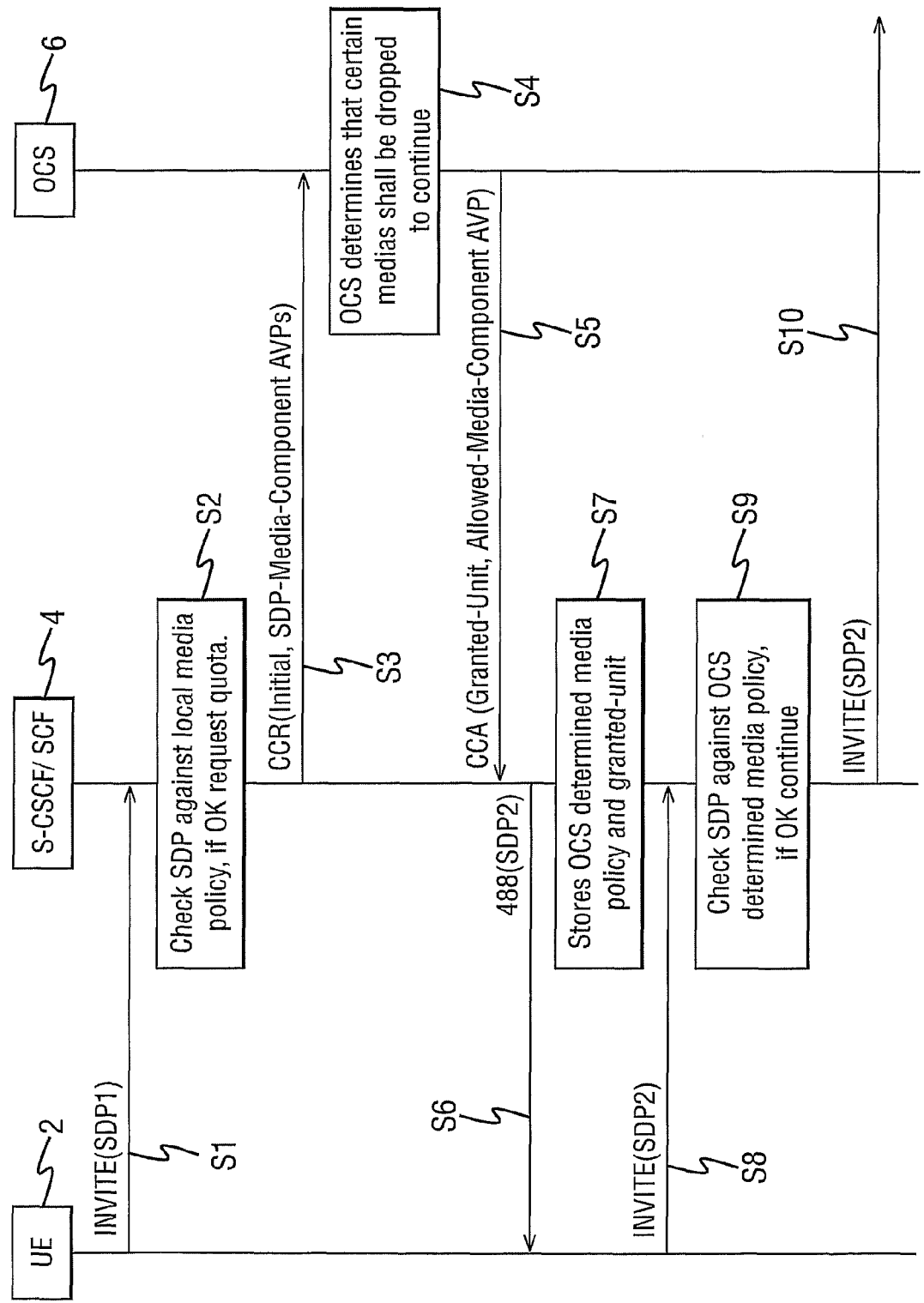
FIG. 2 shows the signal flow in a first embodiment of the invention.

Reference is made to FIG. 2 which shows the signal flow in a first embodiment of the present invention. In particular, FIG. 2 shows the signal flow between the user equipment 2, the S-CFCF/SCF 4, and the OCS 6.

In step S1 the user equipment 2 sends an INVITE message to the S-CSCF/SCF 4. This INVITE message will indicate what service or services the user equipment is requesting. For example, the INVITE message may indicate that the user is requesting a video call with a video component and voice component.

In step S2, the S-CSCF/SCF 4 checks the session data protocol SDP message against local media policy. In other words, the description of the user is checked to see whether or not a user is entitled to obtain the particular service or services. It is also checked to see whether or not the user is a prepaid user or not.

If the user is a prepaid user, then in step S3, a DIAMETER credit control message (CCR CREDIT CONTROL REQUEST) is sent from the S-CSCF/SCF. This will include the information included in the original INVITE message of step 1 indicating the requested media components of the service or services. This is to find out if the user has sufficient funds in his account for the requested service or services. This is a quota reservation request and includes all the media types and codecs. The DIAMETER CREDIT-CONTROL-REQUEST (INTIAL REQUEST) with SDP-Session-Description and SDP-Media-Component AVPs (attribute value pairs) is sent. In the request there will be as many SDP-Media-Component AVPs as media components requested by the UE.

In step S4, the OCS 6 looks at how much money the user has left in his account. The OCS 6 also has a predefined policy which in this embodiment of the present invention is applied to all for example prepaid users. In other embodiments of the invention different policies may be applied to different users. The policy indicates that if the amount of money in the account is less than a certain amount then the user will be denied certain services. Where the user has requested two or more services and/or a service having two or more components, then a decision will be made in the OCS, depending on the amount of money left in the account, as to whether or not the user is permitted to receive all of the services and/or service components. If it is determined that there is not sufficient money in the account to support all of the services and/or service components, a decision is made to determine which of the services and/or service components is to be dropped. For example, in the case of a video call, if the user does not have a certain amount of money in his account, then the user would only be permitted to have the voice part of the call. Another example would be where a user has requested a game session along with an associated chat session. The user may be able to receive only one of these services. In the case of a film having an audio and a visual part, a decision may be made that if the user cannot have both components, then he will receive neither component. The policy contained in the OCS 6 would define which of those services would have priority. The actual policies defined and applied to the user will be controlled by the operator. Thus, in step S4, the OCS determines how much money the user has left in his account and will consider that in relation to the requested services. It should be appreciated that different services may have different thresholds. The OCS will then make a decision to which, if any of the services the user is able to receive. Thus the OCS performs credit reservation and rates the service request. It determines if any of the components or services need to be dropped in order to permit the connection to go ahead and if so which one of the components or services is to be dropped. This step may be repeated through out the duration of a connection.

In step S5, the OCS 6 will send a CCA CREDIT CONTROL ANSWER message back to the S-CSCF/SCF 4 which will provide information as to which media components and/or services requested are permitted and also a granted unit of money for the granted service and/or service components. An AVP indicates the allowed medias e.g. Allowed-Media-Components AVP of type grouped, that is built up of 1 to n SDP-Media-Component AVPs (defined in the third generation partnership specification TS 32.225).

In step S6, the S-CSCF/SCF 4 will send a session data protocol reply to the user equipment indicating which of the services or media components requested are permitted. The message can take any suitable form and may indicate the services and/or components allowed and/or may indicate the services and/or components which are not allowed.

In step S7, the S-CSCF/SCF 4 will store the OCS 6 determined media policy, that is which of the media components or services have been allowed and also the granted units as received from OCS.

In step S8, the user equipment will send another INVITE message which again is a session data protocol message which will now include a request for only those services which are permitted. This will in preferred embodiments of the present invention be done automatically by the user equipment or the application associated with the user equipment, without the intervention of the user. There is no need to a second request to the OCS for an allocated unit of money since this has already been done.

In alternative embodiments of the invention, the user may be advised as to which of the components and/or services are permitted and he will generate a new request based on the allowed services or may alternatively request a different service components and/or services. This latter modification would require checking against the OCS media policy again.

In step S9, the session data protocol message received in step S8 is checked by the S-CSCF/SCF 4 against the stored media policy. If the requested services are in agreement with the policy, this information being stored in S7, then the INVITE request is sent in step S10 to the I-CSCF in the terminated network. The user is then able to receive the requested media component or services.

Figure 3:
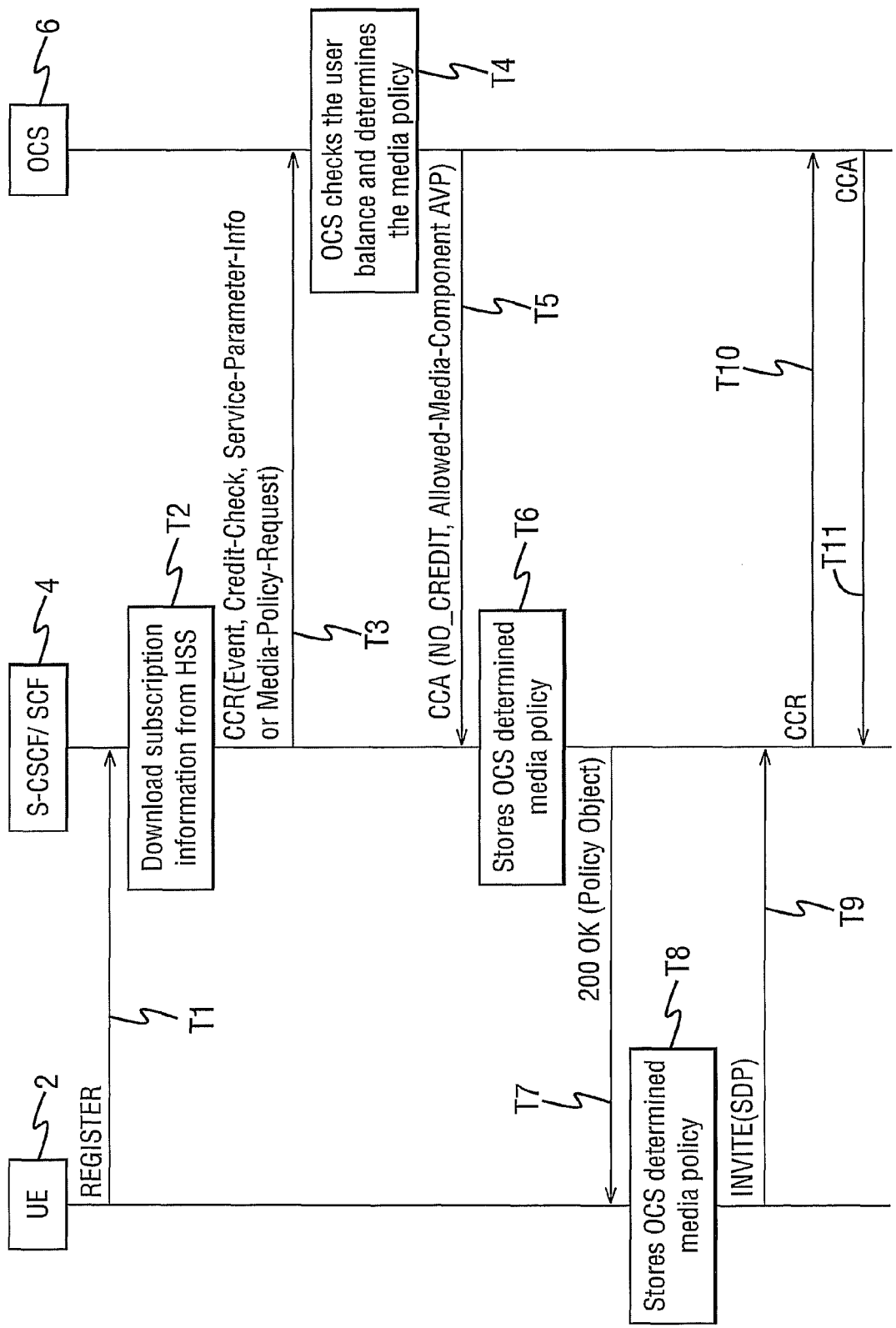
FIG. 3 shows the signal flow in a second embodiment of the invention.

Reference is made to FIG. 3 which shows an alternative embodiment of the present invention. Again, this figure shows the signal flow between user equipment, the S-CSCF/SCF and the OCS.

In step T1, a REGISTER message is sent from the user equipment to the S-CSCF/SCF 4. This is effectively sent for example when the user equipment is switched on.

In step T2, the S-CSCF/SCF 4 will download subscription information from the HSS (home subscriber service), a database storing subscription information about the user.

In step T3, the S-CSCF/SCF 4 will send a CCR request to the OCS 6. This will request a credit check, service parameter information or media. The S-CSCF sends a CREDIT-CONTROL-REQUEST (Event_Request) with Requested-Action AVP set to the value CHECK_BALANCE. For instance, the Service-Parameter-Info AVP specifies that media policy is requested, alternatively a new AVP may be defined to request media policy (for instance Media-Policy-Request AVP of type Enumerated. 0 would mean NOT_REQUESTED, 1 would mean REQUESTED. If present in a check balance request it must be always set to REQUESTED).

In step T4, the OCS 6 will check the user's credit balance and determine the media policy. The policy stored in the OCS 6 can be the same as described in relation to the first embodiment.

If there is enough balance, the OCS will not return any media policy restriction and the Check-Balance-Result AVP will be set to ENOUGH_CREDIT. Otherwise the OCS will return the Allowed-Media-Components AVP, that contain the media policy restrictions, and the Check-Balance-Result AVP will be set to NO_CREDIT. Thus in step T5, the OCS 6 sends the message to the S-CSCF/SCF 4 indicating that there is not enough credit for unlimited use of all of the services by the user equipment and an indication as to the allowed media component(s) and/or service(s) available to the user. This thus takes into account the amount of money that the user has in his account.

In step T6, the S-CSCF/SCF 4 stores the OCS determined media policy for the particular user.

In step T7, the S-CSCF/SCF 4 sends a 200 OK message, a NOTIFY request or any other suitable message to the user equipment which includes information about the policy. For example, this may include an indication as to which service(s) and/or media component(s) are available to the user equipment, information as to those component(s) and/or service(s) that are unavailable to the user, and/or policy information which allows the terminal to make decisions as to whether or not the user is allowed to obtain the requested service(s) and/or the media component(s).

In step T8, the user equipment 2 stores the determined media policy received from the S-CSCF/SCF.

In step T9, the user equipment 2 will send an INVITE message indicating the media component(s) and/or service(s) required by the user. However, the user will only request those component(s) and/or services allowed by the media policy. In other words, the user will not request any component or combination of components and/or services which would not be permitted given the current state of the user's account.

The next step T10 involves the S-CSCF/SCF sending a CCR message, such as shown in step S3 to be OCS 6. Step T11 is the same as S5 shown in FIG. 1 and is sent from the OCS 6 to the S-CSCF/SCF.

The embodiment shown in FIG. 3 differs from that shown in FIG. 2 in that the allowed media component or components (i.e. the policy) is known in the user equipment prior to initiating the session whereas in the embodiment shown in FIG. 3 the decision is made in the OCS 6 during session establishment. It should be appreciated that in the embodiment shown in FIG. 3, a check may be made between steps T10 and T11 to determine that the user still has enough funds for the requested media component(s) and/or service(s).

Figure 4:
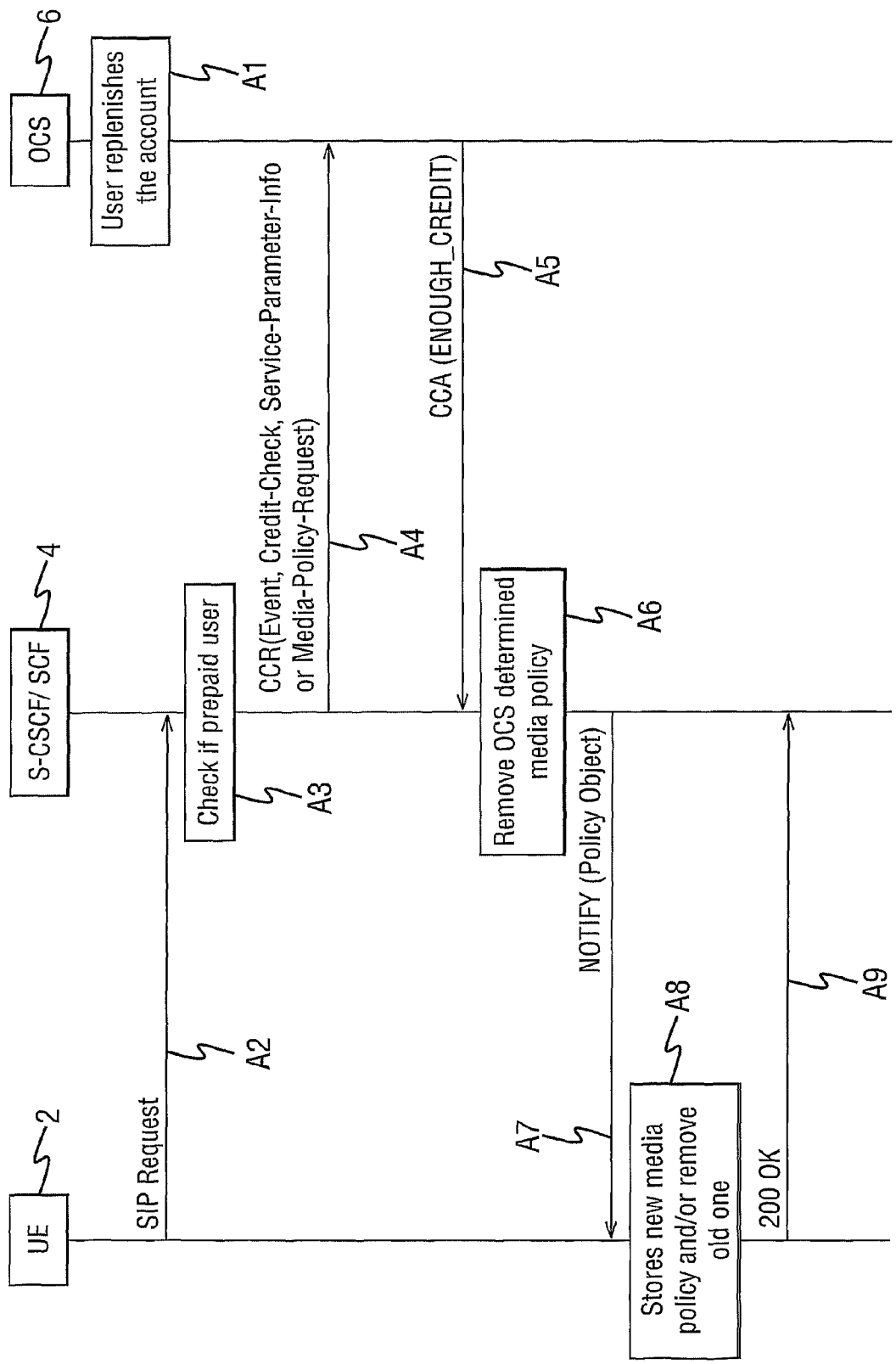
FIG. 4 shows the signal flow in the second embodiment of the invention when a user's account is replenished.

Reference is made to FIG. 4 which is used in conjunction with the embodiment shown in FIG. 3 and shows the situation where the user replenishes his account after registering. In step A1, the user replenishes his account i.e. increases the amount of funds available for a connection.

In step A2, the user sends a message such as an INVITE message to the S-CSCF/SCF 4.

In step A3, the S-CSCF/SCF will check if the user is a prepaid user. If so the next step is A4 in which the S-CSCF/SCF sends a CCR message to the OCS 6. This is the same as the message sent in step T3. If the S-CSCF sent a media policy restriction received from the OCS, it shall trigger a CREDIT-CONTROL-REQUEST (Event-Request) with Requested-Action AVP set to the value CHECK_BALANCE upon any event generated by the user (e.g. INVITE, MESSAGE, SUBSCRIBE etc.) to check if the media policy restriction is still applicable since the user may have replenished his/her account.

In step A5, the OCS provides a message, a CCA message which indicates that there is enough credit. This message may alternatively or additionally indicate that there is sufficient credit with any limitations or indicate if the determined media policy needs to be changed. If the media policy needs to be changed, the new media policy for the user given the new state of his account may be provided by the OCS. If the restriction is not applicable anymore, the S-CSCF will receive an answer with "ENOUGH_CREDIT" (and without Allowed-Media-Components AVP) from the OCS and the terminal will be notified of the new condition.

In step A6, the OCS determined media policy is removed from the S-CSCF/SCF's store or modified in dependence on the information received from the OCS. The S-CSCF/SCF sends a message in step A7 to the user equipment. This message is a NOTIFY message which provides information that the old determined media policy is to be removed or modified. In step A8, the user equipment will remove the old media policy. If there is a new media policy, that would be stored. In step A9, the user equipment 2 sends an acknowledgement message which may for example be a 200 OK message to the S-CSCF/SCF 4.

It should be appreciated that step A4 and A5 may be included in the embodiment shown in FIG. 3 between steps T9 and T10.

Figure 5:
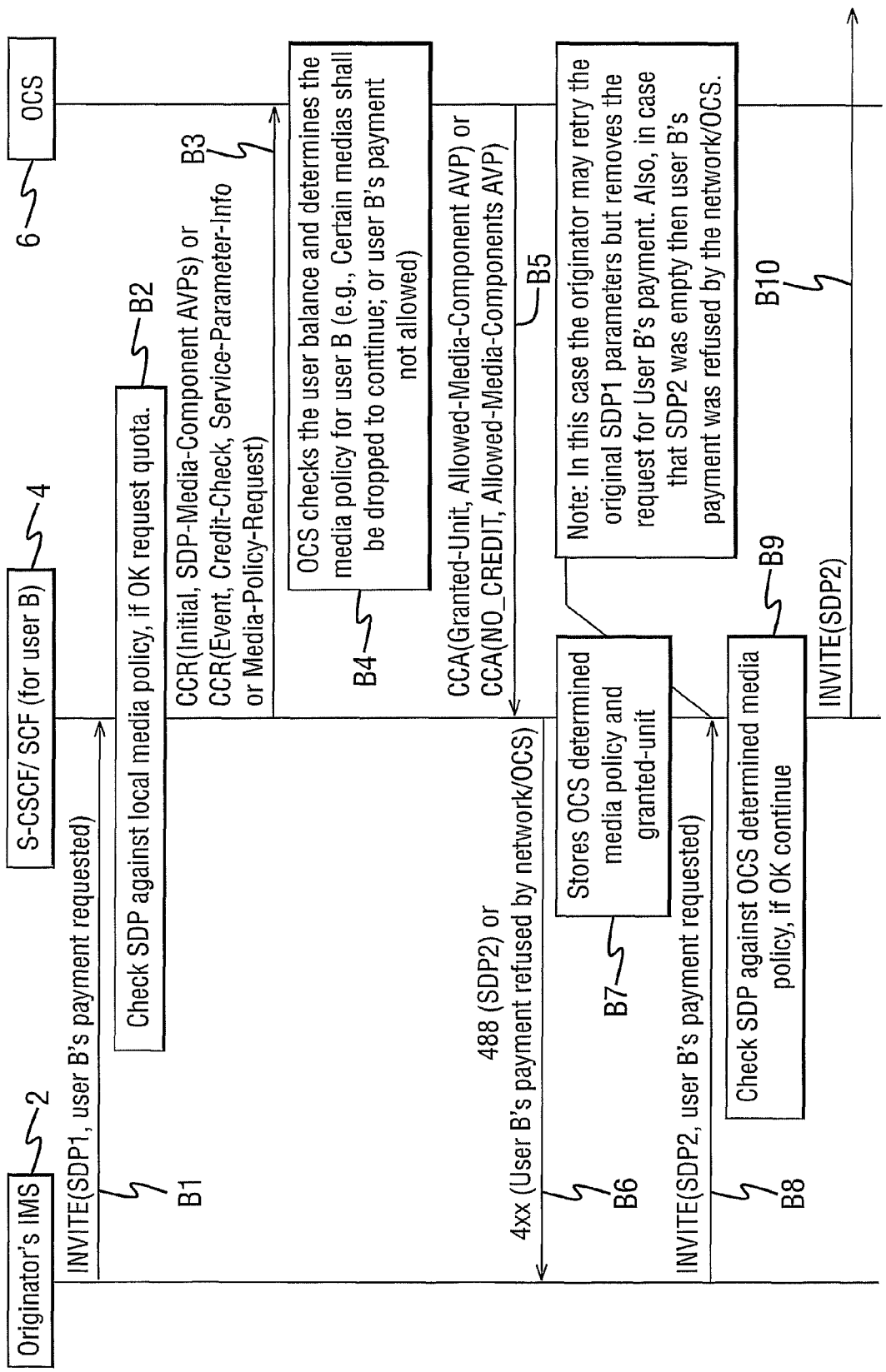
FIG. 5 shows the signal flow where a party different to that initiating a session is to pay.

Reference will now be made to FIG. 5 which shows a further modification to embodiments of the present invention. In the embodiment shown in FIG. 5, the session is being paid for by the terminating user equipment. This can be used in conjunction with either the embodiment shown in FIG. 2 (embodiment 1) or the embodiment shown in FIG. 3 (embodiment 2). The example shown in FIG. 5 is described in relation to the first embodiment. If the calling party requests to the called party to take the charges for the call, the terminating S-CSCF may use two different approaches to check with the OCS if media policy limitation is applicable:

1—since the network cannot know if the called party will accept the charges, the terminating S-CSCF can consult the OCS without requesting money reservation (i.e. Credit-Control-Request(Event-Request) is sent) or 2—the S-CSCF requests money reservation to the OCS as usual.

In step B1, the originating user equipment 2 sends an INVITE message, similar to that sent in step S1 of FIG. 2. However, this message will indicate that it is requested that the terminating user equipment, user B, pay for the session.

In step B2, the S-CSCF 4 which is for user B and not the originating user equipment, checks the SDP against the local media policy. This corresponds to step S2 but is for user B.

In step B3, a message such as shown in step S3 is sent from the S-CSCF/SCF of user B to the OCS handling user B. Either 1 or 2 above is executed.

In step B4, the OCS for user B check the user's balance in the account for user B and determines the media policy for user B, i.e. whether or not certain media components and/or services should be dropped or continued. Alternatively the OCS may determine that user B is not allowed to pay for a connection initiated by another party. This corresponds to step S4 of embodiment 1.

In step B5 the OCS 6 either sends a message such as shown in step S5 if user B will pay. This message may contain service units and possibly media policy if applicable (i.e. if not enough funds in the user's account).

The S-CSCF/SCF sends a message in step B6 to the originating user equipment 2. This is as shown in step S6 in embodiment 1. Alternatively, information will be provided if user B payment has been refused by the network or the OCS either for lack of funds or because user B is not paying for the session.

In step B7, this is the same as step S7 shown in FIG. 2.

The next step B8 is the same as S8 shown in FIG. 2 but the message additionally includes information indicating that user B is to pay for the request.

Step B9 and B10 are the same as steps shown in FIG. 2 and correspond to step S9 and S10 respectively.

If the request for payment by user B is refused, then the user making the request may request the services again, but this time with the user making the request paying for the connection.

Session modification for an existing session may be performed by any of the parties involved. The re-INVITE request can negotiate new medias within the existing dialog, medias may be added or dropped. If some media is dropped from the existing dialog, the charged UE can assume that the session modification complies with the possibly received media policy (OCS determined). However, the charged UE will not add any media if the addition of this media should cause the session to exceed the media policy received from the network.

In the described embodiments, where a user has been refused a component and/or service requested for lack of funds, the user may be provided with a message indicating this. In this way the user will know that his account needs refilling potentially and he will not mistaken attribute failures to receive all the services with network problems.

In embodiments of the invention, not only can the account of a user be taken into account when determining which medias are allowable but also which media are allowed in the network. For example, step S2 may determine if the requested media are allowed in the network.

There may be no restriction on the services and service components available to a user if the user has over a certain amount of funds in his account.

The media policy for a particular user may vary with time as the amount of money in the user's account changes.

Figure 6:
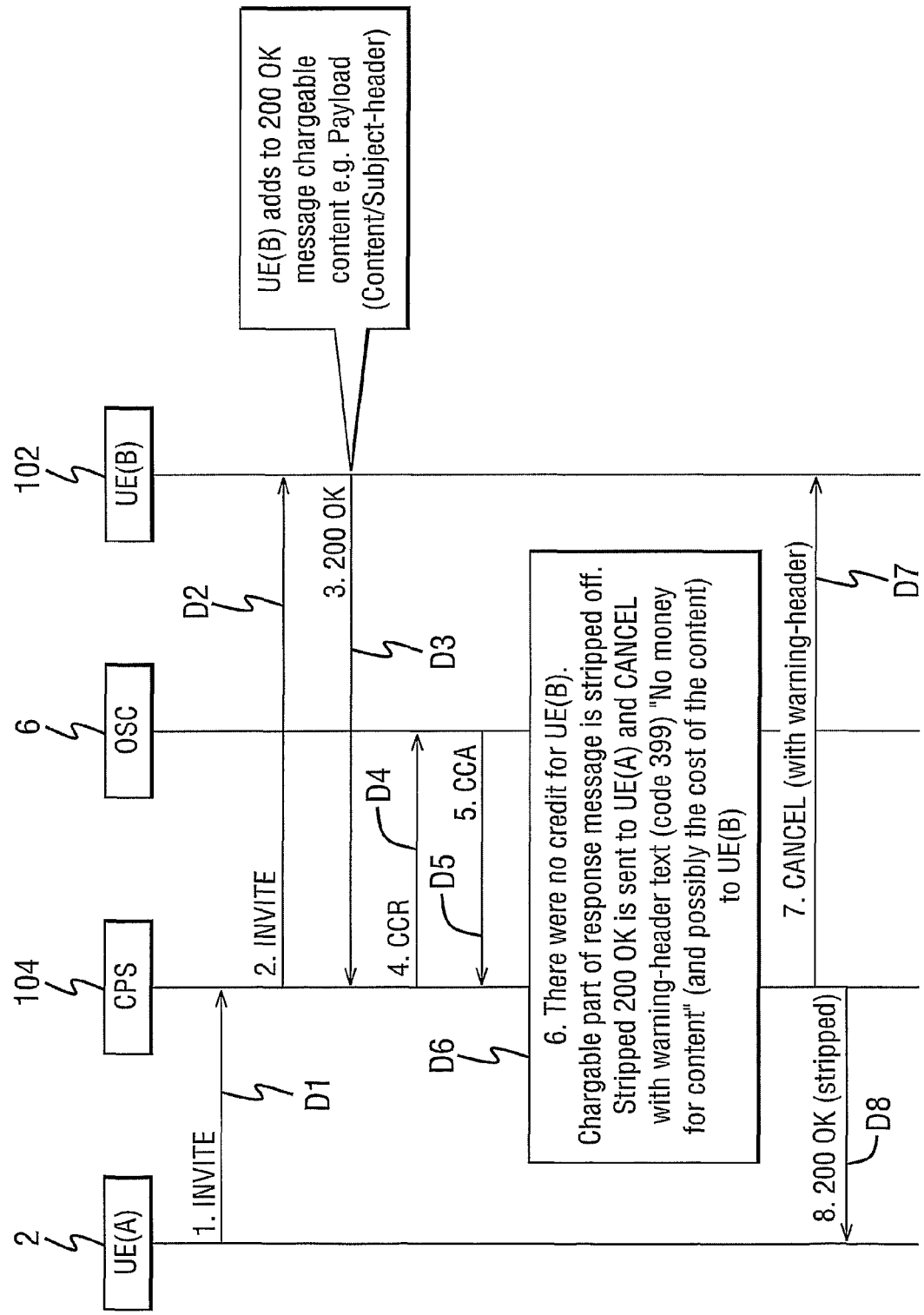
FIG. 6 shows a signal flow where a party different to that initiating a session is to pay in an alternative embodiment.

Reference will now be made to FIG. 6 which shows a still further modification to embodiments of the present invention. As with FIG. 5, the embodiment of FIG. 6 relates to a scenario where a session is to be paid for by a terminating user equipment. This embodiment may be used in conjunction with any of the earlier described embodiments.

For the purposes of description, in FIG. 6 the terminating user equipment is shown. The originating user equipment 2 is denoted as UE(A) and the terminating user equipment, identified by reference numeral 102, is denoted by UE (B) . In addition in FIG. 6 there is shown a connection processor server (CPS), which provides for the connection between the originating user equipment and the terminating user equipment as is known in the art. The connection processor server (CPS) is denoted by reference numeral 104.

Referring to FIG. 6, in a step D1 the originating user equipment 2 sends an INVITE message. This message will indicate that it is requested that the terminating user equipment, 102, pays for the session. The INVITE message is received by the CPS 104, which in turn sends an INVITE message in a step D2 to the terminating user equipment.

Responsive to receipt of the INVITE message in step D2, the terminating user equipment 102 returns an acknowledgement message, being in a SIP session a 200OK message as denoted in step D3.

The terminating user equipment may add chargeable content to the SIP response message in step D3. The chargeable content may, for example, be included in the payload of the message, and may be identified in the header of the message by way of a content/subject description.

The 200OK SIP message transmitted in step D3 is received by the CPS 104.

In a step D4, a DIAMETER credit control message (CCR-CREDIT CONTROL REQUEST) is sent from the CPS 104 to the online service controller (OSC) 6. Responsive to receipt of the CCR message in step D4, the OSC 6 carries out a check to determine if the terminating user equipment has an appropriate level of credit in order to send the chargeable content to the originating user equipment. Thus the CCR message sent in step D4 may include, for example, the information included in the 200OK message transmitted in step D3, indicating the requested media components of the service or services. This enables the OSC 6 to determine if the terminating user equipment has sufficient funds in its account for the delivery of the chargeable content contained in the 200OK message transmitted in step D3.

In step D5 the OSC 6 transmits a CCA (CREDIT CONTROL ANSWER) message back to the CPS 104. This provides information as to whether the chargeable content in the 200OK message transmitted in step D3 is permitted to be delivered to the originating user, in dependence upon the available credit for the terminating user. Where the credit control answer message transmitted in step D5 indicates that there is no credit, or insufficient credit, for the terminating user equipment in order to deliver the chargeable content, the CPS 104 removes, or strips off, the chargeable part of the response message from the terminating user equipment.

The CPS 104 in addition creates a CANCEL message which is transmitted in a step D7 to the terminating user equipment 102. The cancel message indicates to the terminating user equipment that there is an insufficient amount in the account of the terminating user equipment in order to deliver the chargeable content to the originating equipment. This may be indicated by a header text in the message, such as code 399, identifying "no money for content". In addition the cancel message may identify to the terminating user equipment the cost of the content.

The CPS 104 further delivers in a step D8 the 200OK message to the originating user equipment, with the chargeable content removed or stripped therefrom.

Thus when the CPS 104 receives an answer from the OSC 6, such as a DIAMETER CREDIT LIMITED REACHED message, the CPS 104 strips off the chargeable content from the response message (such as the 200OK message) and forwards it to the originating user equipment. A cancel message including a warning, which may be included in the header thereof, is transmitted toward the terminating user equipment to inform the terminating user equipment that it is not allowed to insert any chargeable content in response messages.

As such, in this embodiment of the invention, there is provided a mechanism for generating a default response to the originating user equipment, with no chargeable content therein, to enable a normal session to be initiated even when it is determined that the chargeable content must not be delivered. Furthermore, this embodiment allows for the terminating user equipment to be advised that they do not have sufficient credit in order to send chargeable content. A session may then be established correctly even if the terminating user equipment does not have enough balance in their account to send chargeable content. The initiation of the session without the delivery of chargeable content from the terminating user equipment may be paid for by the originating user equipment.

It should be noted that the OSC is an element which fulfils the functionality of the OCS. The OCS is a term defined by 3GPP for the online charging server.

In general, the user being called by a user requesting the at least one service may thus include, in accordance with this embodiment, chargeable content in a message to be delivered to the user requesting the at least one service, the method further comprising the step of: determining if said chargeable content can be delivered taking into account credit information relating to the user being called.

If said chargeable content cannot be delivered, the method may further comprise the step of delivering the message to the user requesting the at least one service with the chargeable content removed. The delivery of the message may establish a session between the users.

Any charge associated with the establishment of such session may be charged to the user requesting the at least one service.

The method may further comprise the step of transmitting a message to the user being called advising that chargeable content cannot be delivered.

In a further embodiment there is provided a communication wherein the user equipment is arranged to request the at least one service from a further user equipment, the further user equipment including means for optionally including chargeable content in a message for delivering to the user equipment, there further being provided means for determining if said chargeable content can be delivered to the user equipment taking into account credit information relating to the further user equipment.

It should be appreciated that embodiments of the present invention have been described in the context of IMS system. Embodiments of the invention have a wider application and can be used in any appropriate system.

It should be appreciated that different entities may perform the same function as the OCS in different embodiments of the invention. For example a CSCF may provide the functions.

In one modification to the invention, where the connection is modified to drop one or more components and/or services, the user may be allowed to indicate if he wishes to proceed with the modified connection, before the connection is established.

It should be appreciated that the functions of the S-CSCF/SCF may be carried out by both these entities or either one of these entities depending on implementation.

Embodiments of the invention can also be used in charging schemes where a user pays in arrears for services which are provided. For example, the user may be set a threshold for the amount of charges which have accumulated or the amount of charge which can be incurred for a single connection.

It is noted herein that while the above described are exemplifying embodiments of the invention, there are several variations and modifications which may be made to the disclosed solution without departing from the scope of the present invention as defined in the appended claims.

The invention claimed is:

1. An apparatus implemented method, comprising:
receiving, at a session control apparatus from a user apparatus, a session request, wherein the session request indicates a set of service components for at least one service;
determining to transmit, from the session control apparatus to a charging apparatus, a credit control message, wherein the credit control message indicates the set of service components, each service component associated with a different category;
receiving, at the session control apparatus from the charging apparatus, a credit control response message, wherein the credit control response message advises the session control apparatus with a first message component and a second message component, where the first message component identifies at least a subset of the set of service components that can be provided, in view of an amount of money left in an account corresponding to the user apparatus, said subset missing at least one of the set of service components, and where the second message component identifies a granted unit of money for the subset of the set of service components that can be provided; and
determining to send, from the session control apparatus to the user apparatus, a reply to the session request prior to providing any requested service component, wherein the reply comprises a first message component identifying said subset of the set of service components that can be provided and a second message component identifying which service components cannot be provided in lieu of providing the user apparatus with the requested set of service components for the at least one service.

2. A method as claimed in claim 1, wherein said set of service components comprise audio and video components or any other component.

3. A method as claimed in claim 1, wherein said account corresponding to the user apparatus is that of a user of the user apparatus.

4. A method as claimed in claim 1, wherein an amount of money left in an account corresponding to a called apparatus is taken into account.

5. A method according to claim 4 wherein the called apparatus includes chargeable content in a message to be delivered to the user apparatus, the method further comprising:
determining if said chargeable content can be delivered taking into account the amount of money left in the account corresponding to the called apparatus.

6. A method according to claim 5, wherein if said chargeable content cannot be delivered, the method further comprises determining to deliver, to the user apparatus, the message with the chargeable content removed.

7. A method according to claim 6 wherein delivery of the message establishes a session between the user apparatus and the called apparatus.

8. A method according to claim 7 wherein any charge associated with the establishment of such session is charged to the account corresponding to the user apparatus.

9. A method according to claim 6 further comprising determining to transmit, to the called apparatus, a message advising that chargeable content cannot be delivered.

10. A method as claimed in claim 1, wherein said account comprises a prepaid amount of money.

11. A method as claimed in claim 1, wherein taken into account is a cost for each of said set of service components.

12. A method as claimed in claim 11, wherein at least one service component which is most expensive is dropped and not provided.

13. A method as claimed in claim 1, further comprising determining to drop one or more of said set of service components.

14. A method as claimed in claim 13, wherein said determining to drop is based on a predetermined policy.

15. A method as claimed in claim 14, wherein said predetermined policy takes into account at least one of said account and capability of the user apparatus.

16. A method as claimed in claim 14, wherein said predetermined policy is user-specific.

17. A method as claimed in claim 14, wherein said predetermined policy is defined by an operator of a communications network associated with said user apparatus.

18. A method as claimed in claim 14, wherein at least part of said predetermined policy is stored in at least one of said user apparatus, said session control apparatus, and said charging apparatus.

19. A method as claimed in claim 18, wherein said predetermined policy is defined in said charging apparatus.

20. A method as claimed in claim 19, wherein said stored at least part of said predetermined policy is selected based on the account.

21. A method as claimed in claim 18, wherein said stored at least part of said predetermined policy is modified if said account changes.

22. An apparatus implemented method, comprising:
determining to send, from a user apparatus to a session control apparatus, a session request, wherein the session request indicates a plurality of service components, each service component associated with a different category;
receiving, at the user apparatus from the session control apparatus, a reply to the session request prior to receiving any requested service component, wherein the reply comprises a first message component identifying at least a subset of the plurality of service components that can be provided and a second message component identifying which service components cannot be provided in view of an amount of money left in an account corresponding to the user apparatus in lieu of providing the user apparatus with the requested plurality of service components, wherein a credit control response message from a charging apparatus advises of said subset with a first message component and a second message component, where the first message component identifies the subset of the plurality of service components that can be provided and where the second message component identifies a granted unit of money for the subset of the plurality of service components that can be provided, said subset missing at least one of the plurality of service components;
determining to send, from the user apparatus to the session control apparatus, a further session request, wherein the further session request indicates at least one service component of said subset; and
receiving in response to the further session request, at the user apparatus from the session control apparatus, a session comprising said at least one service component of said subset.

23. A method according to claim 22 wherein delivery of a message establishes a session between the user apparatus and a called apparatus.

24. A method according to claim 22 wherein responsive to removal of chargeable content a called apparatus is notified of such.

25. An apparatus implemented method, comprising:
receiving, at a charging apparatus from a session control apparatus, a credit control message, wherein the credit control message indicates a plurality of service components indicated by a session request from a user apparatus, each service component associated with a different category; and
determining to send, from the charging apparatus to the session control apparatus, a credit control response message, wherein the credit control response message advises the session control apparatus with a first message component and a second message component, where the first message component identifies, in lieu of providing the session control apparatus with the requested plurality of service components and prior to the session control apparatus providing any requested service component to the user apparatus, at least a subset of the plurality of service components that can be provided, in view of an amount of money left in an account corresponding to the user apparatus, the subset missing at least one of the plurality of service components, and where the second message component identifies a granted unit of money for the subset of the plurality of service components that can be provided, wherein the session control apparatus sends a reply to the session request from the user apparatus comprising a first message component identifying the subset of the plurality of service components that can be provided and a second message component identifying which service components cannot be provided.

26. A method as claimed in claim 25, wherein an amount of money left in an account corresponding to a called apparatus is taken into account.

27. A method as claimed in claim 26, wherein the called apparatus includes chargeable content in a message to be delivered to the user apparatus, and wherein it is determined if said chargeable content can be delivered taking into account the amount of money left in the account corresponding to the called apparatus.

28. A session control apparatus configured to perform at least:
receive, at the session control apparatus from a user apparatus, a session request, wherein the session request indicates a plurality of service components, each service component associated with a different category;
determine to transmit, from the session control apparatus to a charging apparatus, a credit control message, wherein the credit control message indicates the plurality of service components, where the session control apparatus comprises a processor configured to perform at least the step of determining to transmit the credit control message;
receive, at the session control apparatus from the charging apparatus, a credit control response message, wherein the credit control response message advises the session control apparatus with a first message component and a second message component, where the first message component identifies at least a subset of the plurality of service components that can be provided, in view of an amount of money left in an account corresponding to the user apparatus, said subset missing at least one of the plurality of service components, and where the second message component identifies a granted unit of money for the subset of the set of service components that can be provided; and
determine to send, from the session control apparatus to the user apparatus, a reply to the session request prior to receiving any requested service component, wherein the reply comprises a first message component identifying said subset of the plurality of service components that can be provided and a second message component identifying which service components cannot be provided in lieu of providing the user apparatus with said requested plurality of service components.

29. An apparatus as claimed in claim 28, wherein an amount of money left in an account corresponding to a called apparatus is taken into account.

30. A user apparatus configured to perform at least:
determine to send, from the user apparatus to a session control apparatus, a session request, wherein the session request indicates a plurality of service components, each service component associated with a different category, where the user apparatus comprises a processor configured to perform at least the step of determining to send the session request;
receive, at the user apparatus from the session control apparatus, a reply to the session request prior to receiving any requested service component, wherein the reply comprises a first message component identifying at least a subset of the plurality of service components that can be provided and a second message component identifying which service components cannot be provided in view of an amount of money left in an account corresponding to the user apparatus in lieu of providing the user apparatus with the requested plurality of service components, wherein a credit control response message from a charging apparatus advises of said subset with a first message component and a second message component, where the first message component identifies the subset of the plurality of service components that can be provided and where the second message component identifies a granted unit of money for the subset of the plurality of service components that can be provided, said subset missing at least one of the plurality of service components;
determine to send, from the user apparatus to the session control apparatus, a further session request, wherein the further session request indicates at least one service component of said subset; and
receive at the user apparatus from the session control apparatus in response to the further session request, a session comprising said at least one service component of said subset.

31. A charging apparatus configured to perform at least:
receive, at the charging apparatus from a session control apparatus, a credit control message, wherein the credit control message indicates a plurality of service components indicated by a session request from a user apparatus, each service component associated with a different category; and
determine to send, from the charging apparatus to the session control apparatus, a credit control response message, wherein the credit control response message advises the session control apparatus with a first message component and a second message component, where the first message component identifies, in lieu of providing the session control apparatus with the requested plurality of service components and prior to the session control apparatus providing any requested service component to the user apparatus, at least a subset of the plurality of service components that can be provided, in view of an amount of money left in an account corresponding to the user apparatus, said subset missing at least one of said plurality of service components, and where the second message component identifies a granted unit of money for the subset of the plurality of service components that can be provided, wherein the session control apparatus sends a reply to the session request from the user apparatus comprising a first message component identifying the subset of the plurality of service components that can be provided and a second message component identifying which service components cannot be provided, where the charging apparatus comprises a processor configured to perform at least the step of determining to send the credit control response message.

32. The method of claim 1, further comprising:

receiving, at the session control apparatus from the user apparatus, a further session request, wherein the further session request indicates at least one service component of said subset of the set of service components; and determining to send, from the session control apparatus to the user apparatus, a session comprising said at least one service component of said subset of the set of service components.

\* \* \* \* \*